L. H. LIGHTFOOT.
INNER TUBE.
APPLICATION FILED JUNE 11, 1921.
1,395,439.
Patented Nov. 1, 1921.
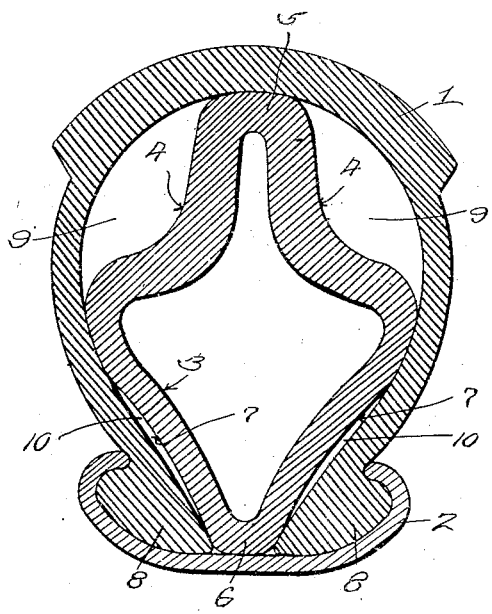
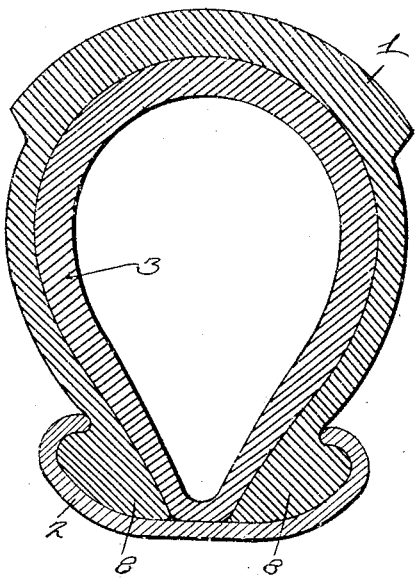
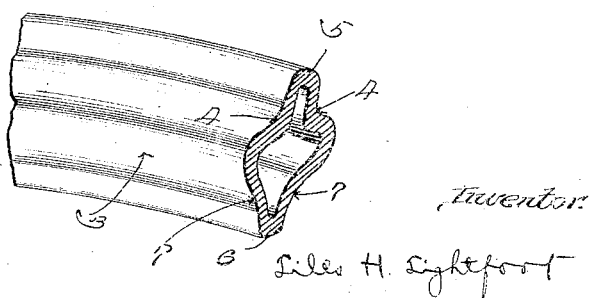
Inventor
Liles H. Lightfoot
By Percy H. Wood
Attorney

UNITED STATES PATENT OFFICE.

LILES H. LIGHTFOOT, OF SIGNAL MOUNTAIN, TENNESSEE, ASSIGNOR TO DU BOIS RUBBER & TUBE COMPANY, OF CHATTANOOGA, TENNESSEE.

INNER TUBE.

1,395,439.

Specification of Letters Patent.  Patented Nov. 1, 1921.

Application filed June 11, 1921. Serial No. 476,669.

*To all whom it may concern:*

Be it known that I, LILES H. LIGHTFOOT, a citizen of the United States of America, residing at Signal Mountain, in the county of Hamilton and State of Tennessee, have invented certain new and useful Improvements in Inner Tubes, of which the following is a specification.

My invention relates to inner tubes of rubber or other elastic material for pneumatic tires and has for its object to diminish if not absolutely prevent deflation of the tire due to ordinary punctures.

A further object is to provide an inner tube of such configuration or cross section that when inflated, circumferential compression or crowding together of the rubber will be greater adjacent the tread where most needed than at the sides.

Other and further objects and advantages will be in part apparent and in part described as the specification is proceeded with.

In the accompanying drawings forming part of the specification:

Figure 1 is a cross sectional view through a tire equipped with my invention before the tire has been inflated;

Fig. 2 is a similar view after inflation; and

Fig. 3 is a perspective view of a fragmentary portion of my improved inner tube detached from the tire or shoe.

Referring more particularly to the drawings wherein like reference numerals refer to corresponding parts throughout the views, 1 denotes the ordinary form of clencher tire and 2 the rim thereof. The inner tube 3 is of rubber but much thicker than the ordinary commercial inner tubes and instead of being cylindrical in shape they are molded with deep inwardly curved corrugations 4 on either side of the centrally disposed outwardly curved protuberance or corrugation 5. It will be noted that the corrugations extend in long curves over the entire upper half or what may generally speaking be termed the tread portion of the inner tube.

The lower half or base of the tube is corrugated in precisely the same manner as the upper half thereof with the exception that the outwardly curved central corrugation 6 and the adjacent inwardly curved corrugations 7 are less pronounced.

In practice the endless tube 3 which is of slightly greater circumferential dimension than the tire is placed within the tire 1 with the corrugation 5 outwardly positioned and the corrugation 6 between the flanges 8 of the shoe, the whole then of course being mounted on the rim 2. Air is then forced into the interior of the tube 3 by any suitable means (not shown) such as a pump and valve. As the pressure within the tube increases the deep corrugations 4 and the shallow corrugations 7 will flatten out or conform to the inner contour of the tire, the long curves of the corrugations permitting of an extremely close contact between the outer periphery of the tube and the inner periphery of the shoe or tire and also eliminates danger of cracking the tube at the point of juncture between the corrugations. This crowding of the rubber or other contents of the tube into the spaces 9 and 10 results in setting up an excessive peripheral transverse compression which together with the air compression will effectively seal ordinary punctures caused by nails, tacks and the like.

By virtue of the fact that the corrugations 4 are much deeper than the corrugations 7, it follows that a correspondingly increased transverse peripheral pressure will occur adjacent the tread of the shoe where most needed. In fact the main function of the shallow corrugations 7 is to resist the transverse pressure set up when the corrugations 4 are flattened out and also to insure proper anchoring or seating of the base portion of the tube between the wings 8 of the shoe and thus prevent shifting of the tube when the latter is being inflated.

While in actual practice the best results are obtained by providing the tube with the shallow corrugations 7, the latter may in some instances be dispensed with, however it is essential in any case that the point of juncture of the corrugations be well rounded, thus eliminating sharp bends or angles.

What I claim is:

1. An inner tube for pneumatic tires comprising a tubular member of elastic material, said tube being formed with an outwardly curved central corrugation and inwardly curved corrugations all disposed within the tread portion thereof, and the base portion being formed with a central outwardly curved corrugation of less prominence than said first mentioned central corrugation and also being formed with inwardly curved corrugations, said last mentioned corrugations being substantially shallower than the inwardly curved corrugations in said tread portion.

2. An inner tube for pneumatic tires comprising a tubular member of elastic material, said tubular member being formed with outwardly curved central portions in its base tread and sides respectively, and inwardly curved portions in said tread and base, merging into said outwardly curved portions, the inwardly curved portions in the base being substantially shallower than the inwardly curved portions in said tread.

In testimony whereof I affix my signature.

LILES H. LIGHTFOOT.